(12) United States Patent
Link et al.

(10) Patent No.: US 6,370,313 B2
(45) Date of Patent: Apr. 9, 2002

(54) METHOD FOR RECORDING INFORMATION ON THE CONTROL TRACK OF A STORAGE MEDIUM

(75) Inventors: Hermann Link, Donaueschingen; Axel Marzluf, Villingen-Schwenningen, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 08/847,026

(22) Filed: May 1, 1997

(30) Foreign Application Priority Data

May 31, 1996 (DE) .......................... 196 21 829

(51) Int. Cl.[7] .................... H04N 5/76; H04N 5/782; H04N 5/917
(52) U.S. Cl. .................. 386/46; 386/57; 386/109
(58) Field of Search .................. 386/46, 83, 68, 386/109, 110, 111, 1, 5, 95, 57, 78, 79, 124, 59, 62, 81; H04N 5/76, 5/782, 5/917

(56) References Cited

U.S. PATENT DOCUMENTS

| | | | |
|---|---|---|---|
| 4,811,127 A | 3/1989 | Okauchi | 360/68 |
| 5,018,027 A | 5/1991 | Roggendorf | 360/14.2 |
| 5,282,049 A | * 1/1994 | Hatakenaka et al. | 386/68 |

FOREIGN PATENT DOCUMENTS

| | | | |
|---|---|---|---|
| DE | 3735539 | 5/1988 | G11B/15/087 |
| DE | 4434034 | 3/1996 | G11B/15/087 |

OTHER PUBLICATIONS

Copy of Search Report.

Kemnitz, Michael, Ein guter Schnitt In: Funkschau Feb. 1994 S. 80–85.

* cited by examiner

Primary Examiner—Robert Chevalier
(74) Attorney, Agent, or Firm—Joseph S. Tripoli; Harvey D. Fried; Francis A. Davenport

(57) ABSTRACT

In one embodiment, data are converted, with the aid of corresponding rules and headers, into data having a fixed block length in such a way that, with the CTL bit definition, no clashes with known data structures of the CTL track such as VISS and VASS occur. The effect achieved by this is that any desired data can be stored on the control track.

9 Claims, 3 Drawing Sheets

LLHHLLLLLHHLLLLLLLL => 4 PULSE
LLHHLLLLLLHHLLLLLLL => 5 PULSE
LLHHLLLLLLLHHLLLLLL => 6 PULSE
*
*
LLHHLLLLLLLLLLLLLHHL => 14 PULSE

METHOD FOR RECORDING INFORMATION ON THE CONTROL TRACK OF A STORAGE MEDIUM

BACKGROUND OF THE INVENTION

1. Field of the Invention

The present invention relates to a method for recording information on the control track of a storage medium, in particular additional information on the control track (CTL track) of a video tape of the kind used in a video recorder.

2. Description of the Prior Art

Video tapes, such as those according to the VHS standard, for example, contain at least one control or CTL track on which control and trigger information items, which are used by the machine for corresponding control purposes, are written. In order to be able to use the CTL track for writing other information items as well, a CTL coding method is defined wherein a logic zero "0" and a logic one "1" are defined by way of the change in the duty ratio of the recorded control pulses, in that a mark-space ratio of 60:40 is stipulated for logic zero "0" and one of 27.5:72.5 is stipulated for logic one "1". By means of this definition, a so-called VISS (Video Index Search System) and VASS (Video Address Search System) data format is stipulated, on the one hand the VISS data format having the following composition: one bit zero "0", followed by 61±3 bits one "1", and subsequently one bit zero "0", and on the other hand the VASS data format comprising 4 headers and three BCD data blocks. In this case, a BCD data block is 4 bits long and a header comprises 1 bit zero "0", followed by 9 bits "1" and a subsequent bit zero "0". In both data formats, the first bit zero "0" viewed in the writing direction forms the reference position. VISS is used according to the above definition as position marking (Index) and VASS as address recording. Furthermore, the 16:9 format can additionally be written onto the CTL track as video information.

SUMMARY OF THE INVENTION

A disadvantage of the above known methods is their limited usability, that is to say it is thus not possible to record additional information items such as tape counts, film titles or the like on the CTL track.

The object of the present invention, therefore, is to develop a method which can be used to record additional information items on the CTL track.

This object is achieved by means of the method according to claim 1. The subclaims relate to advantageous refinements of the invention.

In the method for writing information onto the control track of a storage medium for a tape recording machine, in particular of a video recorder, it is preferable that the data X to be recorded be converted into a code Y of a type such that it permits unambiguous detection of the data within the control track of the storage medium. In general, the control track of the storage medium, which is normally realized by a magnetic tape, is occupied by the information item "0" during recording.

In a first embodiment of the method according to the invention, the conversion of the data X into the data Y is carried out according to the following rules:

a) limitation of the number of successive logic zeros "0" and logic ones "1" to a maximum value max, where b) the maximum value max must be smaller than that of any possible combination of successive zeros "0" or ones "1" used in other standards which are used for marking the control track, c) arrangement of a header for switching on and of a header for switching off the data detection before and after the coded data.

In this case, the headers are formed according to the as following rules:

d) the header for switching on the data detection comprises a number N of logic zeros "0", where min N=max+1, followed by a logic one "1" or any typical data pattern, e) the header for switching off the data detection comprises N successive logic zeros "0" or any typical data pattern or a defined number of bits of the data stream.

In order to simplify the coding, or to avoid superfluous redundancy, the logic one "1" or the typical data pattern of the header for switching on the data reading is already a component part of the coding of the first data block, or rather the data block adjoining the header. In other words, the data blocks of the coded data always begin with a logic one "1" in this case. In this embodiment, a coded data block has a fixed length $Z \geq N$.

The maximum value max of successive logic zeros "0" or ones "1" is preferably set to the value 3.

In a second embodiment of the method according to the invention, the data of the method according to the invention can comprise at least one coded data block, an unambiguously detectable header being transmitted before and after the at least one data block, and, in the case of a plurality of data blocks, the latter being separated by a header. In other words, n data blocks, where n is a natural number greater than zero, require n+1 headers. In this coding option, the information to be coded is coded by the length of the data block between the corresponding headers. Length is in this case generally understood to mean the number of bits in the above CTL coding method which are arranged between the headers, that is to say not the time elapsed between the corresponding headers, since the time is a function of the tape speed and would therefore not be an unambiguous measure for coding information items.

In consideration of the CTL method, a data block is preferably formed by a corresponding number of logic zeros "0" where, as already noted above, the information is encoded in the number of bits, that is to say number of logic zeros "0".

The header in accordance with the method according to the invention comprises a typical bit pattern with a number of logic ones "1", the number of logic ones "1" being less than or equal to the number of header bits. The header preferably comprises two logic ones "1", that is to say the pattern "11". Other patterns are possible.

A third embodiment of the method according to the invention, which is suitable for correcting the tape counter, writes a trigger information item onto the CTL track at predetermined time intervals, it being possible for the trigger information item to have different patterns, that is to say, in general, number of bits, which advantageously achieves a varying meaning of the different trigger information items. It is preferable for one logic one "1" or two logic ones "1" to be written alternately as trigger signal in each case at the end of the predetermined time interval. In this case, in one embodiment it is advantageous that the logic one "1" is written in each case for an even number of time intervals, while the pattern of two logic ones "11" is written for an odd number of time intervals. A suitable time interval selected for the application in a video recorder is one second, which is normally sufficient. Other interval lengths are possible and depend on the corresponding requirements. Thus, for example, a longer predetermined time interval is selected if the error of the tape counter is high.

BRIEF DESCRIPTION OF THE DRAWINGS

Preferred embodiments of the invention are described below with reference to the appended drawings, in which.

DETAILED DESCRIPTION OF THE PREFERRED EMBODIMENT

Figure 1:
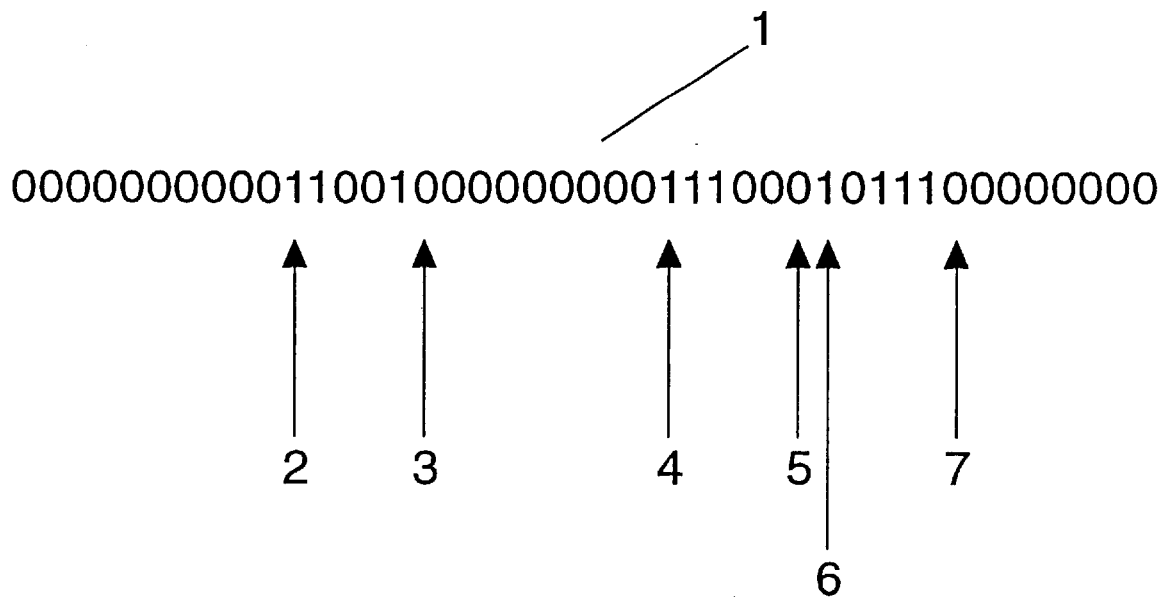
FIG. 1 shows an example of conversion for three-digit data in the upper part and the arrangement of the said data in the data stream of the CTL track in the lower part.

The upper part of FIG. 1 shows the conversion of data X into data Y, for example X="000" into Y="100010", using the rules already evinced in the general section, which are repeated here for the sake of clarity:

a) limitation of the number of successive logic zeros "0" and ones "1" to a defined maximum value max, in the present case, therefore, max=3;

b) this maximum value max must be smaller than any possible combination of other standards, that is to say in this case smaller than 9 logic ones "1" according to the VASS header;

c) switching on of the data detection in order to detect the first data bit after a number N (=detection value) of logic zeros "0", where minimum N=max +1, and this stream of zeros is followed by a logic "1" or any other typical pattern; and d) switching off of the data detection after the last bit of a data stream when N successive zeros "0" or a typical data pattern or a defined number of bits of the data stream have been detected.

Furthermore, it is stipulated in this embodiment that a coded data block has a fixed predetermined length Z, where Z must be greater than max and, in general, greater than or equal to N.

A further example of coding is given in Table 1 below:

TABLE 1

| X | Y |
|---|---|
| 00 | 1000 |
| 01 | 1010 |
| 10 | 1100 |
| 11 | 1100 |

The lower part of FIG. 1 shows a data stream 1 of CTL data of the data coding according to the upper part of FIG. 1. In this case, the value of max is three, the detection value is four, and the data block length is six bits. At point 2, more than 4 logic zeros have been detected, consequently the detection criterion is met and the logic one "1" at point 2 is the first data bit of the block. At point 3, the data block has come to its end (Z=6) and, accordingly, the block "110010" has been detected, which corresponds to the uncoded data value "100". The detection is switched off since 4 logic zeros "0000" are subsequently present in the data stream 1. At point 4, the detection is reactivated (4 logic zeros followed by a logic one). The first data block between points 4 and 5 has the value "111000", corresponding to the uncoded value "110". The next data block is subsequently situated between points 6 and 7, with the content "101110" corresponding to the uncoded value "111". After point 7, more than 4 logic zeros are present in the data stream 1, with the result that the data detection is deactivated again. The conditions for switching the data detection on and off could also be referred to as headers. In this example, the complete front header would be the pattern "00001", the logic "1" at the same time being a component part of the first data block. The rear header for concluding the data transmission would in this case be the pattern "0000".

A fundamentally identical structure of a data stream would result for data coding according to Table 1, the resulting data stream not being illustrated here since it can easily be derived from FIG. 1.

The advantages of this embodiment reside in the fact that data sequences of this coding exclude, that is to say do not use, typical VISS and VASS data patterns, with the result that it is possible to store general data in the CTL track which can be unambiguously reconstructed and do not clash with the existing standards.

Figures 2, 3:
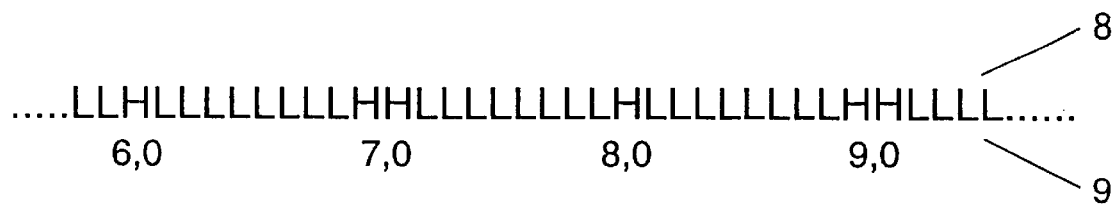
FIG. 2 shows an example of data recording by means of length coding.
FIG. 3 shows an example of tape counter correction by introducing additional, information-carrying trigger pulses, and FIGS. 4 a–c shows the definition of CTL coding, and also the data composition in the VISS and VASS data structure.

FIG. 2 shows a second embodiment of the invention, the information being coded by the data block length of the transmitted CTL bits. Different details of data streams 1 are illustrated in FIG. 2. What is essential here is the use of unambiguous headers which are arranged before and after a data block and are realized in this example by the pattern "11" of two successive logic ones. Other header patterns are conceivable and possible. In the examples of FIG. 2, from top to bottom, 4, 5, 6 and 14 logic zeros are enclosed between the corresponding headers. These run lengths may now be allocated different information items. For example, the patterns could have the meaning given in Table 2:

TABLE 2

| "0000" | 4 Pulses = sync data |
|---|---|
| "00000" | 5 Pulses = 0 or "A" or word such as "the" |
| "000000" | 6 Pulses = 1 or "B" |
| "00000000000000" | 14 Pulses = 9 or a letter, etc. |

The advantages of the second embodiment may be seen in the fact that there is no limitation with regard to the length of the data or the like. Furthermore, a change in the tape speed does not lead to difficulties, since the information resides in the number of bits per data block and not in the length of the time interval between the corresponding headers. Owing to the length coding and the identical headers before and after a data block, the run direction of the data medium, that is to say of the tape in the preferred embodiment, does not have any significance. In other words, in this embodiment it is possible to read the data in any run direction of the tape (that is to say during a forward or reverse run). There is just as little ground for a clash with existing standards such as VISS or VASS, since, if appropriate, the number of logic "0" pulses can be increased. Should data of the known standards be detected, then these data are ignored on account of the headers.

FIG. 3 shows a coding of an information item which can be used to correct the tape counter of a tape machine such as a video recorder. If the video recorder uses the data stream of CTL pulses of the control track for tape counting (so-called linear tape counting), the problem arises that during the counting of the CTL pulses, some of these pulses are, under certain circumstances, lost or incorrectly counted. This occurs above all in the event of a change in the tape run direction or in the tape speed. In order to prevent or at least to reduce this incorrect counting, typical markings or trigger markings are written onto the CTL track at predetermined, freely selectable time intervals using the CTL definition. For example, a marking is written onto the CTL track every second during the recording mode in the example according to the third embodiment. In the present case, one logic one "1" is written at even seconds and two logic ones "11" are written at odd seconds. In general, then, an odd number of logic ones, for example "1", is written onto the CTL track for an even number of time intervals and an even number of logic ones, for example "11", are written onto the CTL track for an odd number of time intervals. This can be discerned in FIG. 3, where one logic one "1" is written for odd seconds and two logic ones "11" are written for even seconds in the data stream 8 of CTL pulses (reference 9 designates the counter reading in seconds). This information can be used to trigger the tape counter and hence to correct it. If, for example, the point 7.0 seconds in FIG. 3 should be passed and the actual counter reading X lies between 6.0 and 7.0, then the tape counter could be set to the value 6.0, since this was the last trigger point passed. If the incorrect counting of the tape counter is greater than 1 second, the time interval can be prolonged, for example to 2 seconds. However, this depends on the type of video recorder used.

The advantages of the third embodiment reside in the fact that the handling of this information coding is very simple, which contributes to robustness of the method, and the method is independent of existing standards. Should problems arise, for example, with the VASS standard, then it would be possible to update the counter after M trigger pulses have been detected in a defined time delay, where M is a natural number.

Figure 4:
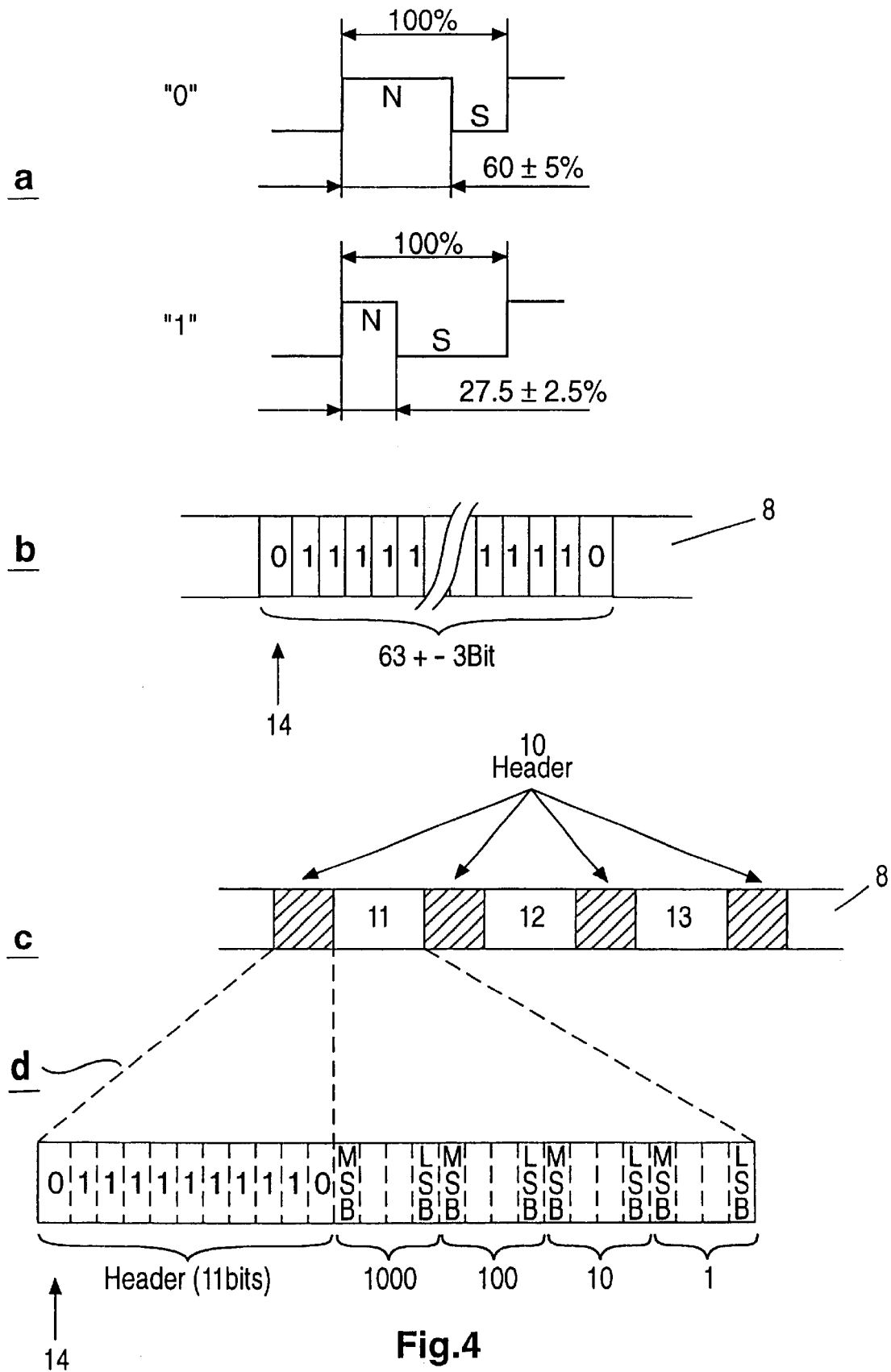

Finally, the upper part a) of FIG. 4 shows the definition of the logic zero "0" and of the logic one "1" in the CTL standard. Logic zero "0" is in this case defined by a mark-space ratio of 60:40 and logic one "1" is defined by a mark-space ratio of 27.5:72.5. The middle part b) of FIG. 4 illustrates the VISS structure using a data stream 8, the VISS marking beginning with one bit zero "0", which is followed by 61 +/−3 bits one "1", followed by one bit zero "0" as termination bit. The first bit (="0") in this case forms the reference position 14. The lower part c) of FIG. 4 finally shows the VASS data structure of a data stream 8. This structure comprises four headers 10, which frame three data blocks 11, 12, 13. A header 10 comprises 11 bits having the pattern "01111111110", that is to say 9 ones "1", framed by a logic zero "0" on both sides. A data block 11, 12, 13 has 4 bits freely available, MSB and LSB being defined as designated in FIG. 4c.

What is claimed is:

1. Method for writing information onto a longitudinally running control track of a storage medium of a helical scan recording device, comprising the steps of:

a) inputting data X to be recorded onto the control track;

b) converting the data X into data Y of a type permitting unambiguous detection of the data within the control track and not clashing with further, existing standards for data written to the control track, said converting step limiting the number of successive logic zeros "0" and logic ones "1" to a maximum value having a value smaller than any possible combination of successive zeros "0" or ones "1" marking the control track according to other standards, and arranging a header before the data Y for switching on the data detection, and providing a header after the data Y for switching off the data detection; and' c) recording the converted data Y, constituting one or more coded data block(s), and the headers, constituting header data blocks, onto the control track.

2. Method for writing information onto a longitudinally running control track of a storage medium of a helical scan video recorder, comprising the steps of:

d) inputting data X to be recorded onto the control track;

e) converting the data X into data Y of a type permitting unambiguous detection of the data within the control track and not clashing with further, existing standards for data written to the control track, f) arranging a header before and after the converted data Y for use in detection of the converted data Y; and, g) recording onto the control track the converted data Y, constituting one or more coded data block(s), headers having header data blocks, and at predetermined time intervals trigger information items for correcting a tape counter, wherein the trigger information items having different lengths, for achieving a varying meaning of the different trigger information items.

3. Method for writing information onto a longitudinally running control track of a helical scan video recorder, comprising the steps of:

a) inputting data X to be recorded onto the control track;

b) converting the data X into data Y of a type permitting unambiguous detection of the data within the control track and not clashing with further, existing standards for data written to the control track corresponding to a VHS specification for VISS and VASS coding (Video Index Search System and Video Address Search System) of the CTL track, wherein a mark-space ratio of the CTL pulses of 60:40 exists for logic zero "0" and a mark-space ratio of 27.5:72.5 exists for logic one "1", c) arranging a header before and after the converted data Y for use in detection of the converted data Y, and d) recording the convened data Y, constituting one or more coded data block(s), and the headers, constituting header data blocks, onto the control track.

4. Method according to claim 1, wherein the step of forming the headers comprise the steps of:

a) forming the header for switching on the data detection with a number N of logic zeros "0", where min N=max+1, followed by a logic one "1" or any typical data pattern of a data block of the data Y to be recorded onto the longitudinally running control track, and b) forming the header for switching off the data detection with N successive logic zeros "0" or any typical data pattern or a defined number of bits of the data stream.

5. Method according to claim 1, further comprising a component part of the coding of the succeeding data block with the logic one "1" or the typical pattern of a header data block for switching on the data reading.

6. Method according to claim 2, further comprising the step of alternately writing one logic one "1" or two logic ones "11" as the trigger signal after a predetermined time interval.

7. Method according to claim 6, wherein the predetermined time interval is one second.

8. Method according to claim 6, further comprising the steps of writing the logic one "1" in each case for an even number of time intervals, and writing two logic ones "11" for an odd number of time intervals.

9. Method according to claim 2, further comprising the step of increasing the predetermined time interval when the counter error is high.

* * * * *